UNITED STATES PATENT OFFICE.

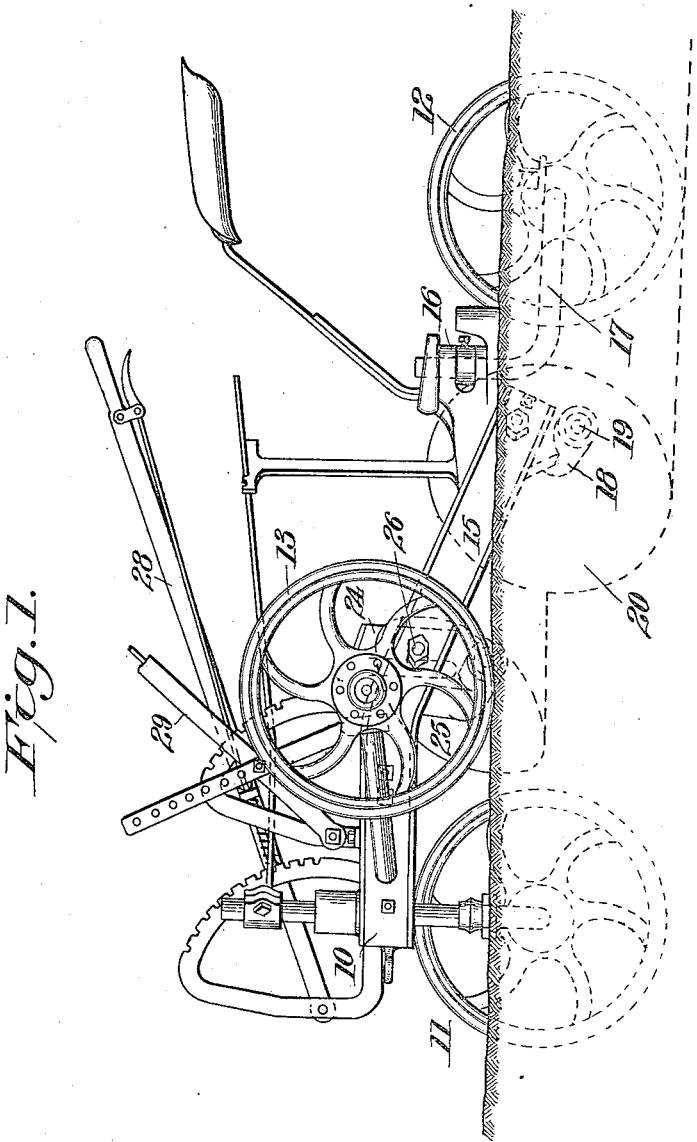

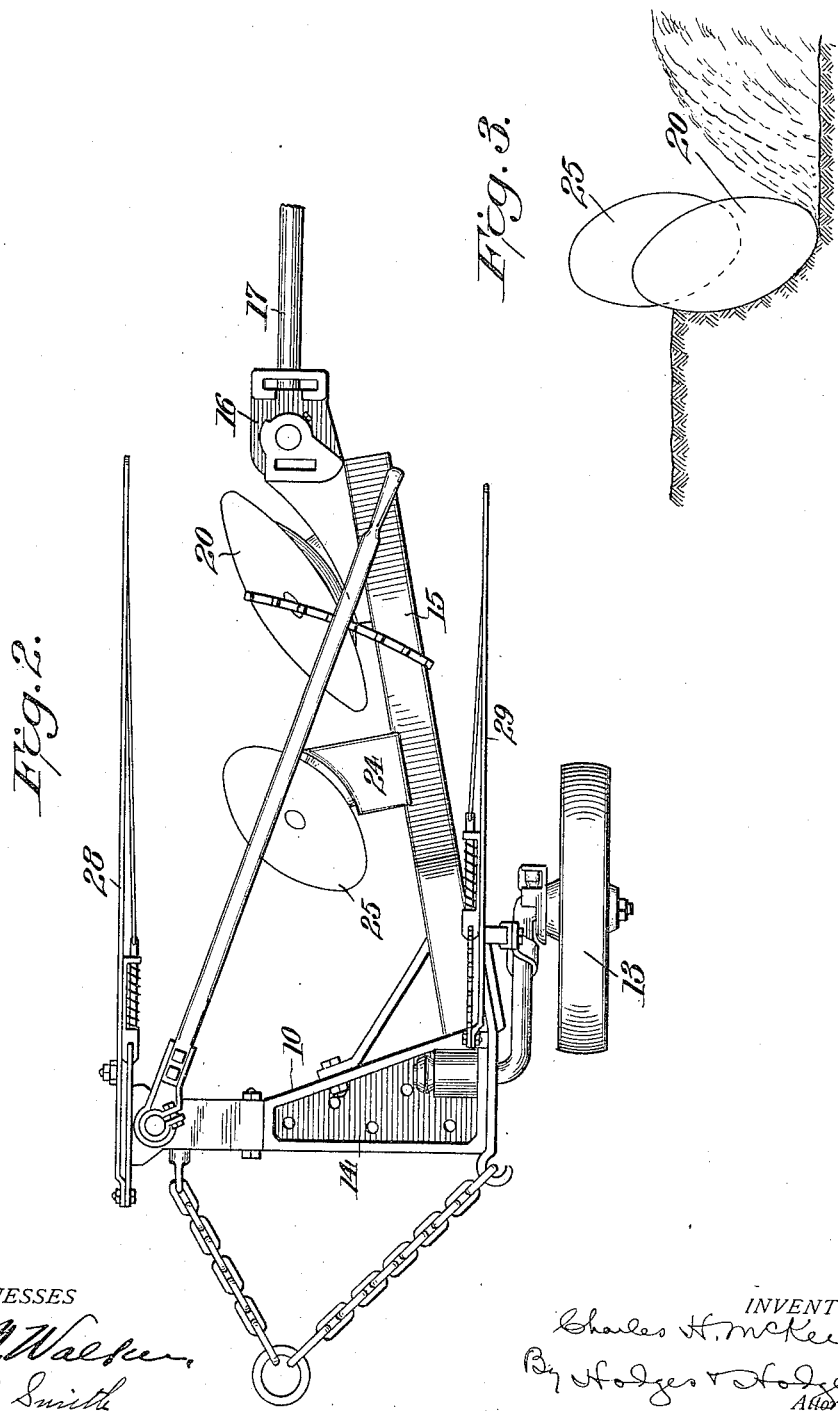

CHARLES H. McKEE, OF PITTSBURGH, PENNSYLVANIA.

TILLING-MACHINE.

1,222,117.  Specification of Letters Patent.  Patented Apr. 10, 1917.

Application filed November 29, 1912. Serial No. 734,148.

*To all whom it may concern:*

Be it known that I, CHARLES H. McKEE, a citizen of the United States, residing at Pittsburgh, in the county of Allegheny and State of Pennsylvania, have invented new and useful Improvements in Tilling-Machines, of which the following is a specification.

This invention relates to a mechanical device or machine for tilling the earth, the same being designed as an improvement on the tilling machine described in Letters Patent 942,469, granted to George Spalding, December 7, 1909.

One of the objects of the invention is to provide means whereby a plurality of rotary concaved disks may be mounted in succession on a suitable frame, the disks being so arranged that they will all come in the line of draft in such manner that neither of them will have the tendency to swing the machine out of true during the plowing operation. A further object is to provide a tilling machine that will be light in draft and readily controlled in its operation.

The invention will be hereinafter fully set forth and particularly pointed out in the claims.

In the accompanying drawings:—

Figure 1 is a side elevation illustrating my improved tilling machine. Fig. 2 is a plan view thereof. Fig. 3 is a detail view illustrating the operation of the disks.

Referring to the drawings, 10 designates a frame supported upon front and rear furrow wheels 11, 12, respectively, and upon a land wheel 13. Frames of different patterns or forms may be employed but preferably a metal frame is used, having two principal members 14, 15, the member 14, when the machine is in operation, being carried in an approximately horizontal position, transverse the furrow to be plowed, and sufficiently high to pass over weeds and trash without clogging. The front furrow wheel 11 is attached to one end of the member 14, the backbone member 15 extending rearwardly from the other end of the member 14. The said backbone member is inclined downwardly and also is deflected laterally to a slight degree. The land wheel 13 is attached to the backbone member 15 on the side farthest from the front furrow wheel.

At the rear end of the backbone is secured a member 16 to which is pivotally connected an arm 17 to the rear end of which is connected the rear furrow wheel 12.

Near the rear end of the backbone a journal bearing 18 is securely attached in which is carried the journal 19 of the rear disk 20. On the inside of said backbone and in advance of the journal 18 is a standard 24 carrying the journal for the front disk 25. Said standard is secured in position by means of a bolt 26 passing through a slot of said standard, whereby the standard may be raised or lowered with respect to the backbone and be rigidly and securely held in any adjusted position. It will be noted that the disk 25 is supported in a higher plane than the disk 20, and that said disk 25 is less in diameter and more dished than the disk 20. That is to say the disk 25 is not only smaller in diameter than the disk 20 but the curvature or concavity thereof is much greater. Each disk when in use acts as a revolving gouge and is set to follow in the lead of its cutting edge along the vertical wall at the bottom of its furrow, as nearly as may be, and each disk is capable of cutting a furrow which in depth is equal to one-half of the diameter of the disk, or nearly so. It will be noted that the front disk, because of its greater curvature, will extend more directly across the furrow than the rear disk, and by reason of the greater diameter of the rear disk, and the fact that it is less dished than the front one, there is room to set it as close, or closer to the unplowed ground than the front disk, and yet the same will be so supported that the extended end of its journal will not rub against the wall of the furrow.

Pivoted levers or arms 28, 29, are provided for raising or lowering the frame with respect to the front furrow wheel 11 and the land wheel 13, and means are provided at 22 for adjusting the vertical position of the frame with respect to the rear furrow wheel. When the machine is in use and after a preliminary furrow has been cut, the wheel 11 runs at the front corner of the frame, along the bottom of the last preceding open furrow; the land wheel 13 runs on the unplowed ground at the side of the machine; and the rear furrow wheel 12 runs along and in the furrow made by the machine and immediately behind the rear or deep cutting disk.

In operation, the journal bearing of the front disk 25 is so adjusted that the active portion of the cutting edge of said front disk will cut a furrow in a manner similar to the front disk in the Spalding patent above referred to. The rear disk is so arranged that ordinarily the active portion of its cutting edge will cut to, or near to, the top of the unplowed ground and take a narrow wedge shaped piece off the wall of the furrow left by the front disk, on its land side, as will more clearly appear in Fig. 3. But at times the rear disk will not cut to the top of the unplowed ground, or it may take off a strip of the unplowed ground, an inch or more in width, depending on the depth to which the rear disk cuts and as to how the front disk is set, up or down, with respect to the rear one. By the active portion of the cutting edge I mean that portion which is for the time being actually in cutting engagement with the ground.

The advantages of my improved tilling machine are readily apparent. It will be particularly observed that the disks are arranged so that they all come in the line of draft in such manner that they are nicely balanced with respect to said line and neither of them will have the tendency to swing the machine out of true. It will be further noted that by reason of the arrangement of the disks herein described the machine is very light in draft and readily and easily controlled in operation. An important advantage also lies in the fact that with the disks arranged as herein described an excellent seed bed is obtained for the reason that the plowed ground is loosened up to better advantage and the top and subsoils completely mixed.

In the drawings but two disks are illustrated, but it is obvious that by lengthening the backbone one or more additional disks may be mounted in succession thereon by duplicating the standard 24, each standard being placed ahead of the standard for the next successive disk, with each disk related to the next following disk in the same manner that the front disk heretofore described bears to the rear disk.

While I prefer to employ disks of different diameters and dished differently, as above stated, disks of like diameters and dished like amounts may be used successfully, especially in loose earth, when arranged in accordance with the requirements of my invention—that is to say, so that they will all come in the line of draft and not have a tendency to swing the machine out of its proper path of forward motion when in operation.

Having thus explained the nature of my invention and described an operative manner of constructing and using the same, although without attempting to set forth all of the forms in which it may be made or all of the forms of its use, what I claim is:—

1. A tilling machine having a plurality of rotary disks mounted in succession, with each disk in advance of, higher than, and of less diameter than the next following disk, each disk having the active portion of its cutting edge as close to the unplowed ground as the active portion of the cutting edge of the next preceding disk or closer.

2. A tilling machine having a plurality of independently supported rotary disks mounted in succession, with each disk in advance of, higher, of less diameter, and more dished than the next succeeding disk, whereby the larger disk may be set as close to the unplowed ground as the smaller disk, or closer.

3. A tilling machine having a plurality of independently supported rotary disks mounted in succession with the support of each disk in advance of, higher than, and partly to the land side of its next following disk, each disk being more dished than the next following disk, each disk having the active portion of its cutting edge as close to the unplowed ground as the active portion of the cutting edge of the next preceding disk or closer.

4. A tilling machine having a plurality of independently supported rotary disks mounted in succession with the support of each disk in advance of, higher, and partly to the land side of the next following disk, each disk being of less diameter than the next following disk, whereby the larger disk may be set as close to the unplowed ground as the smaller disk, or closer.

5. A tilling machine having a plurality of independently supported rotary disks mounted in succession with the support of each disk in advance of, higher than, and partly to the land side of the next following disk, each disk being of smaller diameter and more dished than the next following disk, whereby the larger disk may be set as close to the unplowed ground as the smaller disk, or closer.

6. A tilling machine provided with two disks mounted one in the rear of the other, the rear disk being supported in a lower plane than the leading disk and having the active portion of its cutting edge closer to the land side than the active portion of the cutting edge of the leading disk whereby the two disks coöperate to plow a single furrow in one operation.

7. A tilling machine provided with two disks mounted one in the rear of the other, the rear disk being supported in a lower plane than the leading disk and having the active portion of its cutting edge closer to the land side than the active portion of the cutting edge of the leading disk, the active edge of the rear disk also extending to the top of the unplowed ground, said disks coöperating to plow a single furrow in one operation.

8. A tilling machine provided with two disks mounted one in the rear of the other, the rear disk being supported in a lower plane than the leading disk and having the active portion of its cutting edge extending to the top of the unplowed ground.

In testimony whereof I have hereunto set my hand in presence of two subscribing witnesses.

CHARLES H. McKEE.

Witnesses:
HARRY E. SHELDON,
A. H. McNAMEE.

Copies of this patent may be obtained for five cents each, by addressing the "Commissioner of Patents, Washington, D. C."